Patented May 4, 1943

2,318,464

UNITED STATES PATENT OFFICE 2,318,464

TREATMENT OF TEXTILE MATERIALS

Walter Glen Cameron and Thomas Henry Morton, Braintree, England, assignors to Courtaulds Limited, London, England, a British company No Drawing. Application July 10, 1941, Serial No. 401,862. In Great Britain August 30, 1940

8 Claims. (Cl. 8—100)

This invention relates to the treatment of cellulose textile materials whereby their dyeing properties are improved.

It has already been proposed to treat cellulose textile materials with a solution containing cyanamide and formaldehyde and thereafter to dry and heat the so-treated material in order to confer on the material an affinity for those dyes normally used for dyeing wool. The use of higher aldehydes such as acetaldehyde and isohexyl aldehyde in conjunction with cyanamide has also been proposed for the same purpose.

We have now found that advantages are obtained by impregnating the cellulose textile material with a solution of cyanamide and an aliphatic hydroxy aldehyde or hydroxy ketone with or without an acid, neutral or alkaline catalyst, and thereafter drying and heating the impregnated material.

Examples of hydroxy aldehydes and ketones which may be used are: glucose, aldol (2-hydroxy butyraldehyde), diacetone alcohol (4-methyl-4-hydroxy-pentan-2-one) and the compound (1-hydroxy-butan-3-one) obtained by the condensation of acetone and formaldehyde. These compounds are water soluble and not readily volatile at ordinary temperatures.

If desired a small proportion of a phenolic compound such as resorcinol may be added to the impregnating solution with improved results.

The material treated according to the present invention has a good affinity for those dyes usually used for dyeing wool and the material dyed with such dyes has a good fastness to washing and a very good fastness to light.

The following examples illustrate how the invention may be carried out in practice although the invention is not restricted to these examples.

Example 1

A solution containing 3 per cent of cyanamide and 3 per cent of aldol (2-hydroxy-butyraldehyde) is adjusted to a pH value of 9 by the addition of sodium hydroxide. 1 per cent of potassium carbonate is then added and staple fibre produced by the viscose process and sold under the registered trade-mark "Fibro" is impregnated with the resulting solution. Excess liquid is then removed by squeezing and the material dried at 70° centigrade for 20 minutes. It is then heated to 120° centigrade for 10 minutes and the resulting product has a marked affinity for acid wool dyes, for example Azo Geranine 2GS, Coomassie Violet RS, Solway Ultra Blue BS, Quinoline Yellow AS, Erio fast Cyanine S and Naphthalene Orange GS. The dyed material has a good fastness to washing and to light.

Example 2

The impregnating solution containing 3 per cent of cyanamide and 3 per cent of diacetone alcohol (4-methyl-4-hydroxy-pentan-2-one) is adjusted to a pH value of 8.5 by means of sodium hydroxide and 1 per cent of potassium carbonate then added. After impregnation and squeezing and drying the material as in Example 1, the material is further heated for 10 minutes at 145° centigrade. The dyeing properties of the so-treated material are similar to those of that treated according to Example 1.

Example 3

Material of the kind used in Example 1 is impregnated in a solution containing 3 per cent of cyanamide, 3 per cent of aldol, 0.1 per cent of resorcinol and 0.1 per cent of sodium carbonate having a pH value of approximately 8. Impregnation, removal of excess liquid and drying, are carried out as in the previous examples and heating is then effected for 15 minutes at 130° centigrade, whereupon material with similarly improved dyeing properties is obtained.

Example 4

The impregnating solution containing 3 per cent of cyanamide and 3 per cent of aldol is adjusted to a pH value of 4 by the addition of dilute hydrochloric acid. After impregnation, drying and heating as in the previous examples, improved dyeing properties with respect to acid wool dyes are obtained.

What we claim is:

1. A process for improving the dyeing properties of cellulosic textile material which comprises impregnating the said material with a solution of cyanamide and an aliphatic compound selected from the group consisting of water soluble hydroxy aldehydes and hydroxy ketones and then drying and heating the material.

2. A process for improving the dyeing properties of cellulosic textile material which comprises impregnating the said material with a solution of cyanamide, an aliphatic compound selected from the group consisting of water soluble hydroxy aldehydes and hydroxy ketones and a small proportion of a phenolic compound and then drying and heating the material.

3. A process for improving the dyeing properties of cellulosic textile material which comprises incorporating in the said material cyanamide and 2-hydroxy-butyraldehyde, and then heating the material.

4. A process for improving the dyeing properties of cellulosic textile material which comprises incorporating in the said material cyanamide, 2-hydroxy-butyraldehyde, and a small proportion of resorcinol, and then heating the material.

5. A process for improving the dyeing properties of cellulosic textile material which comprises impregnating the said material with a solution of cyanamide and 2-hydroxy-butyraldehyde and then drying and heating the material.

6. A process for improving the dyeing properties of cellulosic textile material which comprises impregnating the said material with a solution of cyanamide, 2-hydroxy-butyraldehyde and a small proportion of resorcinol and then drying and heating the material.

7. A process for improving the dyeing properties of cellulosic textile material which comprises impregnating the said material with a solution containing cyanamide, an aliphatic compound selected from the group consisting of water soluble hydroxy aldehydes and hydroxy ketones and a catalyst and then drying and heating the material.

8. A process for improving the dyeing properties of cellulosic textile material which comprises impregnating the said material with a solution containing cyanamide, an aliphatic compound selected from the group consisting of water soluble hydroxy aldehydes and hydroxy ketones, a small proportion of a phenolic compound and a catalyst and then drying and heating the material.

WALTER G. CAMERON.
T. H. MORTON.